United States Patent [19]

Stockmeyer

[11] Patent Number: 4,676,943
[45] Date of Patent: Jun. 30, 1987

[54] METHOD AND APPARATUS FOR PRODUCING LONGITUDINALLY STRETCHED THERMOPLASTIC FILM

[75] Inventor: Hans Stockmeyer, Isernhagen, Fed. Rep. of Germany

[73] Assignee: Hermann Berstorff Maschinenbau GmbH, Hanover, Fed. Rep. of Germany

[21] Appl. No.: 719,301

[22] Filed: Apr. 3, 1985

[30] Foreign Application Priority Data

Apr. 18, 1984 [DE] Fed. Rep. of Germany ....... 3414676

[51] Int. Cl.$^4$ .............................................. B29C 55/06
[52] U.S. Cl. ..................................... 264/288.4; 26/71; 26/106
[58] Field of Search ............... 264/288.4, 210.1, 210.7, 264/556; 26/71, 106

[56] References Cited

U.S. PATENT DOCUMENTS

| 2,547,763 | 4/1951 | Land et al. | 264/288.4 |
| 2,767,435 | 10/1956 | Alles | 264/288.4 |
| 3,141,194 | 7/1964 | Jester | 264/556 |
| 3,159,696 | 12/1964 | Hodgson, Jr. | 264/556 |
| 3,547,891 | 12/1970 | Snead et al. | 264/210.1 |
| 3,632,726 | 1/1972 | Knox et al. | 264/288.4 |
| 4,477,407 | 10/1984 | Hetherington et al. | 264/288.4 |

FOREIGN PATENT DOCUMENTS

| 691806 | 8/1964 | Canada | 264/288.4 |
| 1957578 | 5/1971 | Fed. Rep. of Germany | 264/288.4 |
| 45028 | 3/1983 | Japan | 264/210.1 |
| 761278 | 9/1980 | U.S.S.R. | 264/288.4 |

Primary Examiner—James Lowe
Attorney, Agent, or Firm—Schwartz, Jeffery, Schwaab, Mack, Blumenthal & Evans

[57] ABSTRACT

When longitudinally stretching thermoplastics films in a stretching zone comprising at least one roll by the application of a stretching force thereto, width contraction of the film generally occurs. In the present invention, this is prevented by the improvement of directing compressed air against the film while it is passing over at least one of the rolls and is being stretched longitudinally. The compressed air emerges from nozzles distributed over the entire length of the rolls and retains the film in position on the roll or rolls, thereby preventing its width from contracting. The improved apparatus suitable for carrying out the improved method comprises nozzle means disposed adjacent to and directed towards the film located on the roll means and compressed-air supply means communicating with the nozzle means.

11 Claims, 2 Drawing Figures

METHOD AND APPARATUS FOR PRODUCING LONGITUDINALLY STRETCHED THERMOPLASTIC FILM

FIELD OF THE INVENTION

The present invention relates to a method of producing longitudinally stretched thermoplastics material films and to an apparatus which is particularly suitable for carrying out such a method. More particularly, the present invention relates to a method in which the material is stretched on rolls and is retained in position thereon, thereby preventing transverse shrinkage of the film.

BACKGROUND OF THE INVENTION AND PRIOR ART DISCUSSION

In U.S. Pat. No. 3,351,697, there is described an apparatus for longitudinally stretching thermoplastics material films in which the stretching zone comprises a plurality of rolls. Such an apparatus is capable of stretching the film to up to 2.5 times its original length.

To prevent the width of the film from contracting during the longitudinally stretching, rolls are used which have diameters of less than 40 mm. This is because it has hitherto been assumed that if the film is looped around at least 50% of each individual roll, the film will be sufficiently supported to prevent the width from contracting. If the rate of stretching does not exceed a pre-determined value, usually of the order of 10 m/min, satistactory results can be achieved utilising such an apparatus.

However, there are certain disadvantages associated with the manufacture of stretched films using such an apparatus. Firtsly, although the rolls have a maximum diameter of 40 mm, they may have a length of up to 2600 mm. The rolls therefore tend to sag under their own weight. Such sagging is highly undesirable and it is consequently necessary to ensure that the spacings between adjacent individual rolls are small. More importantly, considerable problems arise with regard to the tempering and drive of such small diameter rolls.

In British Patent Specification No. 1,394,805, there is described a thermoplastics material stretching apparatus in which the stretching zone is formed from individual rolls. To prevent the width of the film from contracting whilst it is being longitudinally stretched, the adhesion of the film to the rolls is enhanced by electrostatically charging the film.

Both of these apparatuses have the additional disadvantage that they only operate at very low speeds. If the plastics material film has been electrostatically charged, it is very difficult to remove the charge therefrom. It is therefore very difficult to prevent particles of dust from being attracted to the charged film during further processing. Moreover, it is also difficult to remove the film from such a roll in a tension-free manner.

Hitherto unknown problems also arise if an attempt is made to effect longitudinally stretching of film at high speeds. In particular, it is not possible, using these known apparatuses, to prevent the width of the film web from contracting. This is because, at high speed, the film web does not adhere well to the individual stretching rolls. Air enters the gap between the film web and the external surface of the stretching rolls. This causes a cushion of air to be formed in the region in which the film loops around the stretching rolls. This air cushion permits the release of plasticiser residues and other liquid components from the film, which residues settle on the roll surface. This, in turn, causes specks to be formed on the film.

OBJECTS OF THE INVENTION

The present invention seeks to provide a method of longitudinally stretching a thermoplastics material film, such as a polyvinylchloride film which does not suffer from the above-mentioned disadvantages. In a practical application, the present invention seeks to provide a method which permits a film having a thickness of between 20 $\mu$m and 300 $\mu$m to be stretched longitudinally to at least 2.5 times its original length at a run-off speed of up to 150 m/min, without the width thereof being caused to contract to any appreciable extent. The present invention also seeks to provide an apparatus which permits such a method to be implemented.

SUMMARY OF THE INVENTION

According to the present invention, there is provided a method of preventing transverse shrinkage of thermoplastics film when such film is being longitudinally stretched by a stretching force, the stretching being effected in a stretching zone comprising a plurality of rolls wherein compressed air is directed towards at least one of the rolls so as to impinge against the film whilst the film is located on the at least one roll and whilst the longitudinal stretching is being effected, whereby the film is retained in position on the at least one roll and is thereby prevented from shrinking transversely, such compressed-air treatment being effected whilst the film is in a plastic state.

Also according to the present invention, there is provided an apparatus for preventing transverse shrinkage of thermoplastics film when such film is being subjected to longitudinal stretching by a stretching force, the apparatus comprising a stretching zone formed from at least one roll and at least one nozzle communicating with a source of compressed air, each nozzle being directed towards a corresponding one of the rolls, the direction of the nozzle being such that, in use, the compressed air impinges against the film whilst the film is located on the roll, whereby the film is retained in position on the roll and is prevented from shrinking transversely whilst being stretched longitudinally.

By pressing the film web against the stretching rolls by means of compressed air, it is surprisingly found that the web is looped substantially halfway round the roll without the width of the web contracting whilst the film is being longitudinally stretched up to 2.5 times its original length. Even if the web is 260 cm wide, it is still possible to maintain the width whilst discharging the web from the stretching zone at a speed of approximately 160 m/min., (2.66 m/sec.). This is despite the fact that substantial tensile forces must be applied to the web to achieve the stretching. In such a case, the film web had a thickness of approximately 150 $\mu$m when introduced into the stretching zone and a thickness of 60 $\mu$m after discharge from the stretching zone.

The compressed air pressure, which acts upon the film and has a water column of between 10 mm and 30 mm, is regulated in dependence upon the desired discharge speed and film thickness.

In a preferred embodiment of the apparatus each compressed-air nozzle has an outlet aperture in the form of a slot or in the form of a row of perforations, the aperture having a maximum width of 0.6 mm and being disposed at a maximum spacing of 5 mm from the roll with which the nozzle is associated.

Advantageously, the nozzles are so directed that the point of contact of the compressed air with the film coincides with the point of contact of the film with the roll. By causing the point of contact of the compressed air with the film web to be coincident with the point or line of contact of the film with the appropriate stretching roll, the adhesion of the film to the roll is enhanced. Moreover, the formation of air bubbles between the film and the external surface of the stretching roll is prevented.

Even better adhesion of the film to the roll, without air bubble formation, is possible if the nozzle outlet is disposed angularly relative to the roll with which it is associated, the angular disposition determining, in use, the point of contact of the compressed air with the film and is selected to lie between the point of contact of the film with the roll and a right angle relative to the roll axis. In such a case, any small air bubbles appearing between the underside of the film and the external surface of the roll are pushed back away from the roll and are therefore not drawn into the gap between the film web and the external surface of the roll.

Desirably, each nozzle is pivotally mounted about the axis of the roll with which it is associated. Such pivotal mounting permits the optimum point for directing the compressed air onto the moving film web to be set in a simple manner.

Further preferably, a plurality of rolls are provided, the rolls being disposed in series and being traversed sequentially by the film, wherein a nozzle is associated with the first roll to be traversed and a further nozzle is associated with each alternate roll subsequently traversed by the film. This permits the rolls to be separated so that the film web can be introduced into the stretching zone in a direction which is transverse to the general direction of travel of the film through the stretching zone.

Still further advantageously, a nozzle is associated with the second roll to be traversed by the film and a further nozzle is associated with each alternate roll subsequently traversed by the film whereby the nozzles associated with the first roll and each alternate roll thereafter are directed in a first direction and the nozzles associated with the second roll and each alternate roll thereafter are directed in a second direction, the second direction being at an angle of substantially 180° to the first direction. This permits the two separate groups of rolls to move more easily.

From the point of view of preventing the width of the film web from contracting during the longitudinal stretching of the film web, reasonable results can be achieved if only the first stretching roll in the stretching zone is provided with a compressed-air nozzle over its entire length. Such length may, for example, be 260 cm. This is probably due to the fact that the forces which tend to cause the film to contract are at their most intense in the region of the first stretching roll.

BRIEF DESCRIPTION OF THE DRAWINGS

One embodiment of an apparatus in accordance with the present invention will be further described, by way of example, with reference to the accompanying drawings, in which.

DESCRIPTION OF PREFERRED EMBODIMENT

Figure 2:
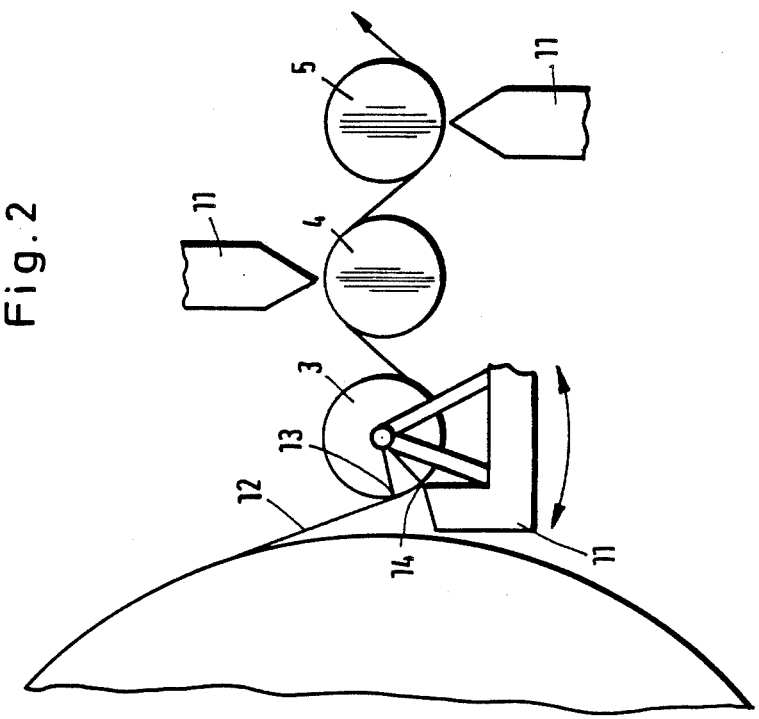
FIG. 2 shows on an enlarged scale, the ringed portion I shown in FIG. 1.
Figure 1:
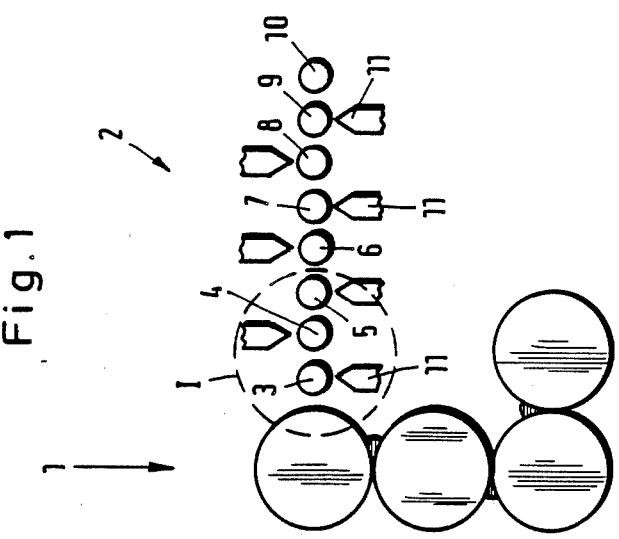
FIG. 1 shows, schematically, a calender having a stretching apparatus according to the present invention provided downstream thereof.

In the drawings, there is shown a device 1 for calendering plastics material having a plastics material stretching apparatus 2 disposed immediately downstream thereof. The stretching apparatus comprises a plurality of stretching rolls identified by the reference numerals 3 through 10.

Nozzles 11 for supplying compressed air from below are distributed over the entire length of rolls 3, 5, 7 and 9 and for supplying compressed air from above over the entire length of the rolls 4, 6, 8 and 10. The air is fed to the nozzles 11 by means of a compressor or fan (not shown) through suitable conduits (not shown).

The film web 12 is removed from the last of the calender 1 and transferred to the rolls 3 through 10. This removal is effected at a speed which is of the order of 2.5 times higher than that at which the film is discharged by the calender.

Slightly downstream of the linear point of contact 13 of the film 12 with the roll 3, the film 12 is retained in position by means of compressed air blowing through the nozzle 11. This prevents the width of the film from contracting.

After the film web 12 has been passed around approximately 180° of the periphery of the roll 3, the film web 12 is fed to roll 4 and also passes around approximately 180° of the periphery of this roll. Due to the compressed air which is emitted from the nozzle 11, the web on the roll 4 is also prevented from contracting in respect of its width. This operation is repeated on the subsequent rolls 5 through 10.

The film is then fed to cooling rollers (not shown) which are located downstream of the stretching device. By so doing, the longitudinal stretching of the film which has been effected is stablilised by cooling. In other words, the stretched film is made tension-free.

I claim:

1. Apparatus for longitudinally stretching thermoplastics film while in a plastic state and without transverse shrinkage comprising:
    (a) film feed means;
    (b) film stretching means in the form of a plurality of longitudinally extending stretching rolls, the first one of which is positioned adjacent said film feed means for receiving said film, said film thereafter longitudinally traversing the remaining rolls to effect stretching of the film;
    (c) nozzle means disposed adjacent and directed to at least said one roll, and means for supplying compressed air to and through said nozzle means for impinging on the surface of said film for maintaining said film in intimate contact with said one roll, and wherein
    (d) said nozzle means is provided with outlet aperture means disposed angularly relative to said one roll towards which it is directed, such angle determining the point of contact of the compressed air with the film and being selected to lie between the initial point of contact of said film with said one roll and a plane perpendicular to a plane or planes parallel to the axes of said stretching rolls,
    whereby said film is retained on said rolls during stretching of the film by said rolls, without transverse shrinkage of said film.

2. An apparatus as recited in claim 1, wherein said outlet aperture means of said nozzle are in the form of slots, said slots having a maximum width of 9.6 mm and being disposed at a maximum spacing of 5 mm from said one roll.

3. An apparatus as recited in claim 1, wherein said outlet aperture means of said nozzle means are in the form of a row of perforations, said perforations having a maximum width of 0.6 mm and being disposed at a maximum spacing of 5 mm from said one roll.

4. An apparatus as recited in claim 1, wherein said nozzle means is mounted on the opposed ends of said one roll so as to be pivotable about the axis of said one roll.

5. An apparatus as recited in claim 1, wherein said nozzle means comprises a plurality of nozzles, each said nozzle being directed towards said film on a corresponding one of said rolls, said plurality of rolls comprising a second roll disposed downstream of said first roll, and subsequent rolls disposed downstream of said second roll, and wherein said nozzles are directed towards said film on said first roll and every subsequent alternate roll.

6. An apparatus as recited in claim 5, wherein certain of said nozzles are directed towards said film on said first roll and on said subsequent alternate rolls from a first direction, and further including further nozzles associated with said second roll and every subsequent alternate roll, said further nozzles being directed towards said second roll and every subsequent alternate roll from a second direction, said first and second directions being substantially 180° apart.

7. A method for longitudinally stretching thermoplastic film in a plastic state while preventing transverse shrinkage, comprising the steps of:
 (a) feeding said film to a plurality of longitudinally positioned stretching rolls and applying a longitudinal stretching force to said film, one of said stretching rolls being positioned adjacent the feed, and
 (b) directing compressed air at an angle toward said one roll for impinging on the surface of said film for maintaining said film in intimate contact with said one roll, said angle being selected to lie between the initial point of contact of said film with said one roll and a plane perpendicular to a plane or planes parallel to the axes of said stretching rolls, whereby said film is retained on said rolls during stretching of the film, without transverse shrinkage of the film.

8. The method of claim 7 wherein said compressed air directed against said film is at a water column pressure of 10 to 30 mm.

9. A method as recited in claim 7, wherein said stretching step includes longitudinally stretching said film up to 2.5 times its original length.

10. A method as recited in claim 7, wherein said method includes discharging said film from said rolls after said stretching step at a speed of up to 160 m/min.

11. A method as recited in claim 7, wherein said stretching step reduces the thickness of said film by up to 60%.

* * * * *